(12) United States Patent
Stewart

(10) Patent No.: US 9,486,965 B2
(45) Date of Patent: Nov. 8, 2016

(54) COMPOSITE COLUMNAR STRUCTURE HAVING CO-BONDED REINFORCEMENT AND FABRICATION METHOD

(75) Inventor: Samuel Ray Stewart, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/326,005

(22) Filed: Dec. 14, 2011

(65) Prior Publication Data
US 2013/0156979 A1 Jun. 20, 2013

(51) Int. Cl.
A47G 19/22 (2006.01)
B29C 70/08 (2006.01)
B32B 1/08 (2006.01)
B32B 9/00 (2006.01)
B32B 9/04 (2006.01)
(Continued)

(52) U.S. Cl.
CPC ........... B29C 70/088 (2013.01); B29C 70/542 (2013.01); B29C 70/543 (2013.01); B29C 70/86 (2013.01); B29C 70/865 (2013.01); B32B 1/08 (2013.01); B32B 9/005 (2013.01); B32B 9/047 (2013.01); B32B 15/14 (2013.01); F16C 7/026 (2013.01); B29K 2705/00 (2013.01); B29K 2709/02 (2013.01); B29L 2031/06 (2013.01); B29L 2031/3076 (2013.01); B29L 2031/748 (2013.01); B32B 2597/00 (2013.01); Y02T 50/433 (2013.01); Y10T 29/4998 (2015.01); Y10T 428/13 (2015.01); Y10T 428/1321 (2015.01); Y10T 428/1355 (2015.01)

(58) Field of Classification Search
CPC . B29C 70/088; B29C 70/542; B29C 70/543; B29C 70/86; B29C 70/865; B29K 2705/00; B29K 2709/02; B29L 2031/06; B29L 2031/3076; B29L 2031/748; B32B 15/14; B32B 1/08; B32B 2597/00; B32B 9/005; B32B 9/047; F16C 7/026; Y10T 428/1321; Y10T 29/4998; Y10T 428/1355; Y10T 428/13; Y02T 50/433
USPC ................................................ 428/34.7, 35.7
See application file for complete search history.

(56) References Cited

U.S. PATENT DOCUMENTS 4,014,184 A 3/1977 Stark
4,272,971 A 6/1981 Loyd et al.
(Continued)

FOREIGN PATENT DOCUMENTS

DE 102007015909A1 A1 10/2008
EP 0267063 A1 5/1988
(Continued)

OTHER PUBLICATIONS

Stewart, "Tubular Composite Strut Having Internal Stiffening and Method for Making the Same," U.S. Appl. No. 13/288,491, filed Nov. 3, 2011, 37 pages.
(Continued)

Primary Examiner — James Yager
(74) Attorney, Agent, or Firm — Yee & Associates, P.C.

(57) ABSTRACT

A columnar structure comprises a generally hollow laminate core, an outer composite skin, and a sleeve-like reinforcement. The sleeve-like reinforcement surrounds the laminate core and is sandwiched between the laminate core and the outer composite skin for reacting compressive loads imposed on the columnar structure.

19 Claims, 6 Drawing Sheets

(51) Int. Cl.
*B32B 15/14* (2006.01)
*B29C 70/54* (2006.01)
*B29C 70/86* (2006.01)
*F16C 7/02* (2006.01)
*B29L 31/06* (2006.01)
*B29L 31/30* (2006.01)
*B29K 709/02* (2006.01)
*B29L 31/00* (2006.01)
*B29K 705/00* (2006.01)

(56) References Cited

U.S. PATENT DOCUMENTS

| | | | |
|---|---|---|---|
| 4,275,122 A | | 6/1981 | Fisher |
| 4,469,730 A | * | 9/1984 | Burhans ................ 428/36.3 |
| 4,851,065 A | | 7/1989 | Curtz |
| 5,511,604 A | * | 4/1996 | Ravenhall et al. ............. 164/97 |
| 6,114,050 A | | 9/2000 | Westre et al. |
| 6,425,836 B1 | | 7/2002 | Misono et al. |
| 6,510,961 B1 | | 1/2003 | Head et al. |
| 8,123,996 B2 | | 2/2012 | Booker et al. |
| 2002/0006523 A1 | * | 1/2002 | Obeshaw ................ B21C 37/15 428/593 |
| 2003/0086752 A1 | * | 5/2003 | LeMole ................... 403/102 |
| 2004/0148776 A1 | | 8/2004 | Myers et al. |
| 2007/0007386 A1 | | 1/2007 | Coupe et al. |
| 2008/0119296 A1 | * | 5/2008 | Kennedy ................ 464/181 |
| 2008/0129041 A1 | | 6/2008 | Allen et al. |
| 2008/0131630 A1 | | 6/2008 | Schnelz |
| 2009/0202767 A1 | | 8/2009 | Booker et al. |
| 2010/0266790 A1 | | 10/2010 | Kusinski et al. |
| 2011/0073708 A1 | | 3/2011 | Biornstad |
| 2012/0312922 A1 | | 12/2012 | Rosman |

FOREIGN PATENT DOCUMENTS

| | | | |
|---|---|---|---|
| FR | 2540430 A3 | | 8/1984 |
| FR | 2890591A1 A1 | | 3/2007 |
| FR | 2957843A1 A1 | | 9/2011 |
| GB | 2215008 A | | 9/1989 |
| JP | S55159312 A | | 12/1980 |
| JP | S61261035 A | | 11/1986 |
| JP | 2008307842 A | | 12/2008 |
| WO | WO02/057573 A1 | | 7/2002 |
| WO | W02008066606 A1 | | 6/2008 |
| WO | WO 2009138660 A2 | * | 11/2009 |

OTHER PUBLICATIONS

PCT search report dated Jan. 31, 2013 regarding application PCT/US2012/058994, filed Oct. 5, 2012, applicant reference 11-0383-PCT, applicant the Boeing Company, 12 pages.
Takatoya et al., "Compression After Impact Properties of Hybrid Composite Materials," 16th International Conference on Composite Materials, Jul. 2007, pp. 1-5.
U.S. Appl. No. 13/288,491, filed Nov. 3, 2011, Stewart.
PCT search report dated Mar. 12, 2013 regarding application PCT/US2012/061997, filed Oct. 25, 2012, applicant reference 11-0789-PCT, applicant the Boeing Company, 12 pages.
Office Action, dated Jan. 3, 2014, regarding USPTO U.S. Appl. No. 13/288,491, 30 pages.
Notice of Allowance, dated Aug. 6, 2014, regarding USPTO U.S. Appl. No. 13/288,491, 5 pages.
Final Office Action, dated Apr. 15, 2014, regarding USPTO U.S. Appl. No. 13/288,491, 9 pages.
International Search Report and Written Opinion, dated Jun. 17, 2014, regarding Application No. PCT/US2012/061997, 7 pages.
International Search Report and Written Opinion, dated May 6, 2014, regarding Application No. PCT/US2012/058994, 7 pages.
Canadian Intellectual Property Office Examination Search Report, dated May 29, 2015, regarding Application No. 2,851,824, 3 pages.
Canadian Office Action mailed Feb. 22, 2016, regarding application No. 2851824, 3 pages.
Office Action, dated Feb. 11, 2016, regarding USPTO U.S. Appl. No. 14/500,480, 26 pages.
Final Office Action, dated Aug. 25, 20166, regarding U.S. Appl. No. 14/500,480, 10 pages.
Russian Office Action mailed Jul. 7, 2016, regarding application No. 2014128475, 4 pages. (English translation not found).
Chinese Second Office Action mailed Jul. 8, 2016, regarding application No. 201280053017.2, 7 pages. (English translation not found).
Japanese Office Action, dated Aug. 2, 2016, regarding Application No. 2014539996, 62 pages.

* cited by examiner

COMPOSITE COLUMNAR STRUCTURE HAVING CO-BONDED REINFORCEMENT AND FABRICATION METHOD

CROSS REFERENCE TO RELATED APPLICATION

This application is related to co-pending U.S. patent application Ser. No. 13/288,491 filed Nov. 3, 2011, which is incorporated by reference herein in its entirety.

BACKGROUND INFORMATION

1. Field

The present disclosure generally relates to composite columnar structures, and deals more particularly with a hybrid composite tubular strut internally reinforced to better resist axial compression loads.

2. Background

Columnar structures formed of composites are used in a variety of applications because of their favorable strength-to-weight ratio. For example, composite tubular struts may be used in the aerospace industry as a support or brace for transferring loads in either direction along the longitudinal axis of the strut, thus placing the strut in either compression or tension. Fittings on the ends of the strut provide additional strength at the points of attachment of the strut to a structure.

The tubular struts mentioned above may be fabricated from fiber reinforced resin laminates. Such laminates may exhibit greater load carrying ability when placed in tension than when placed in compression. This is because the compressive strength of the resin is generally less than its tensile strength. Consequently, in order to meet performance specifications, it may be necessary to over-size the strut to carry a specified level of compression loading. Over-sizing the strut, however, may add cost and/or undesired weight to a vehicle or other structure to which the strut is attached.

Accordingly, there is a need for a composite columnar structure that exhibits improved ability to carry compression loads. There is also a need for a cost effective method of making a columnar structure with improved compression load carrying ability that adds little or no weight to the structure.

SUMMARY

The disclosed embodiments provide a composite columnar structure such as a tubular strut that exhibits an improved ability to resist axial compression loads while adding little or no weight to the structure. Improved compression load capability is achieved by incorporating a sleeve-like reinforcement around laminated plies forming a core of the strut. The reinforcement allows composite tubular struts and similar columnar structures to be designed that are "right-sized" to meet both compression and tension load carrying specifications while minimizing the weight of the strut.

According to one disclosed embodiment, a columnar structure is provided comprising a generally hollow laminate core, an outer composite skin, and a reinforcement. The reinforcement surrounds the laminate core and is sandwiched between the laminate core and the outer composite skin for reacting compressive loads imposed on the columnar structure. The laminate core may be substantially tubular and the reinforcement may include a sleeve-like layer of material extending substantially completely around the laminate core. The sleeve-like layer of material may be one of a metal such as without limitation, titanium, a precured fiber reinforced composite or a ceramic, and the laminate core may be a fiber reinforced resin such as a carbon fiber reinforced plastic. The reinforcement may comprise first and second halves that are seamed together in a direction parallel to a longitudinal axis of the laminate core. In one embodiment, the reinforcement may include corrugations on the inside wall thereof which may control wrinkling of underlying laminate plies of the laminate core during consolidation and curing of the laminate core.

According to another embodiment, a strut comprises a generally tubular, fiber reinforced resin core, and a sleeve-like reinforcement around the fiber reinforced resin core having a compressive strength greater than the compressive strength of the fiber reinforced resin core. The sleeve-like reinforcement may be a corrugated metal, and may include first and second halves assembled together along seams extending in a longitudinal direction of the fiber reinforced resin core. The strut may further comprise a pair of spaced apart end fittings including a pair of attachment pins adapted to attach the strut to a structure. The pins lie substantially in a first plane, and the seams lie substantially in a second plane generally perpendicular to the first plane. In one variation, the sleeve-like reinforcement is a ceramic. In another variation, the sleeve-like reinforcement is titanium, and the fiber reinforced resin core is carbon fiber reinforced plastic. The sleeve-like reinforcement is co-bonded to the fiber reinforced resin core and to an outer skin.

According to still another embodiment, a method is provided of making a strut, comprising fabricating a composite laminate core, fabricating a sleeve-like reinforcement, assembling the sleeve-like reinforcement over the composite laminate core, and fabricating an outer skin over the sleeve-like reinforcement. The method may further comprise co-bonding the sleeve-like reinforcement to the composite laminate core and to the outer skin. Fabricating the sleeve-like reinforcement may include forming corrugations on an inside face of a member. Fabricating the composite laminate core includes laying up plies of a fiber reinforced resin, and assembling the sleeve-like reinforcement over the composite laminate core includes placing the member on the composite laminate core with the corrugations against the plies of the composite laminate core. The method may further comprise consolidating and curing the composite laminate core, and using the corrugations on the member to control wrinkling of the plies during the consolidation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
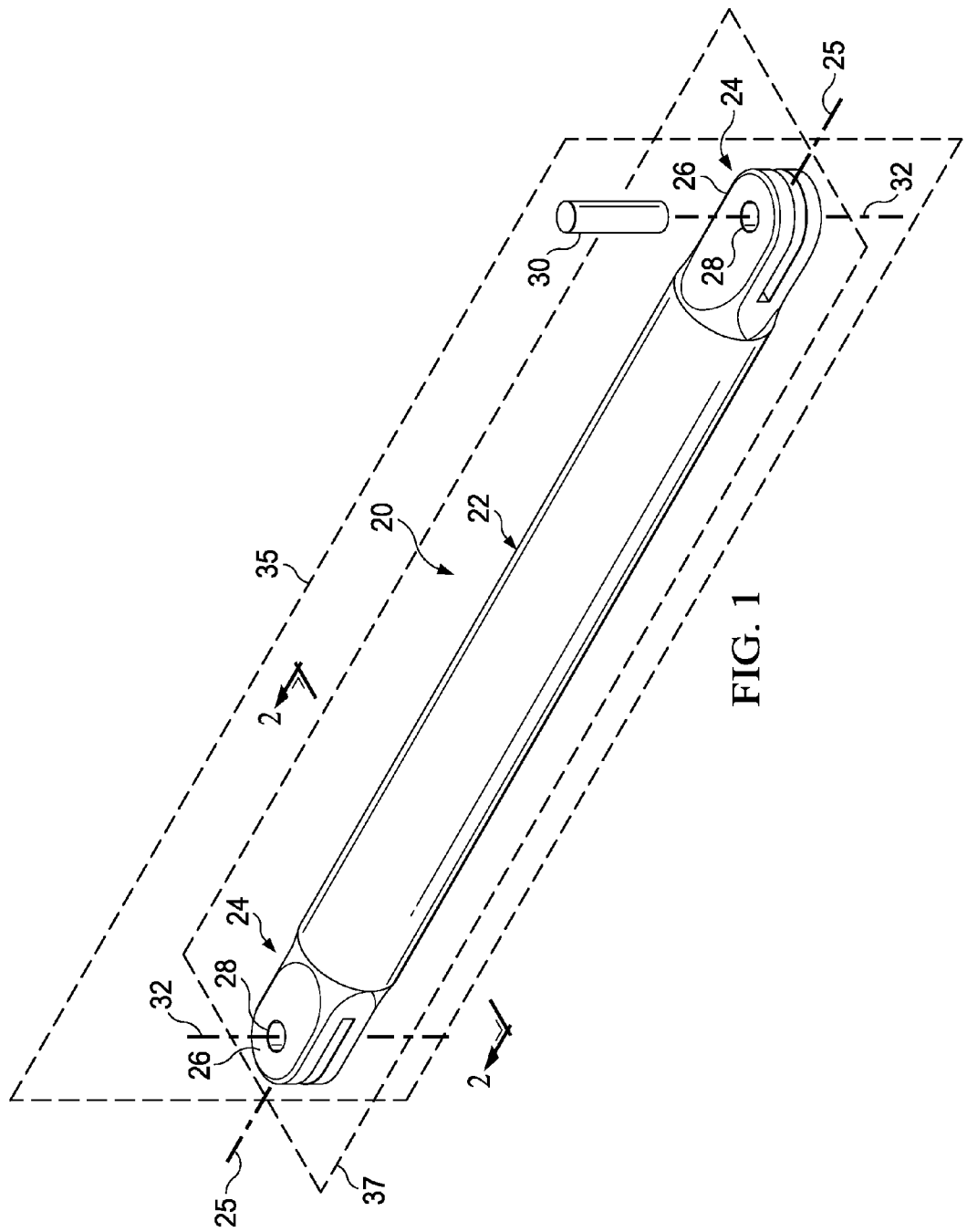
FIG. 1 is an illustration of a perspective view of a hybrid composite tubular strut exhibiting an improved ability to resist axial compression loads according to one disclosed embodiment.

Referring first to FIG. 1, a composite columnar structure illustrated as an elongate strut 20 includes a generally cylindrical, tubular body 22 and a pair of end fittings 24 for attaching the strut 20 to a structure (not shown). The strut 20 may function to transfer compression loads along the longitudinal axis 25 of the tubular body 22, and may also transfer loads that place the tubular body 22 in tension. Each of the end fittings 24 may be made of a metal such as aluminum or titanium, or a composite or other suitable materials. The end fittings 24 may be fabricated by casting, machining, or other common manufacturing techniques. In applications where the end fittings 24 are formed of composite materials, they may include metallic inserts and/or metallic bushings (not shown).

Each of the end fittings 24 may include a clevis 26 having a central opening 28 aligned along an axis 32 for receiving a clevis pin 30 that attaches the strut 20 to the structure. The axes 32 of the clevis pins 30 lie substantially in the same plane 35. The clevis pins 30 along with clevis 26, form pivotal connections between the strut 20 and the structure to which it is attached. The strut 20 may be employed, for example and without limitation, as a brace between an aircraft engine (not shown) and an airframe (not shown). Any of a variety of other types of end fittings 24 are possible, depending on the intended use of the strut 20. Also, as previously mentioned, the strut 20 may function to transfer axial loads biaxially along the longitudinal axis 25 of the strut 20 so that the strut 20 may be placed either in tension or compression or both in an alternating fashion along the longitudinal axis 25. In some applications, the strut 20 may also experience limited torsional loading. In the illustrated example, the cross sectional shape of the tubular body 22 is substantially round and constant along its length, however other cross sectional shapes are possible, such as, without limitation, square, triangular, hexagonal or pentagonal shapes. Also, the tubular body 22 may have one or more tapers along its length.

Figure 2:
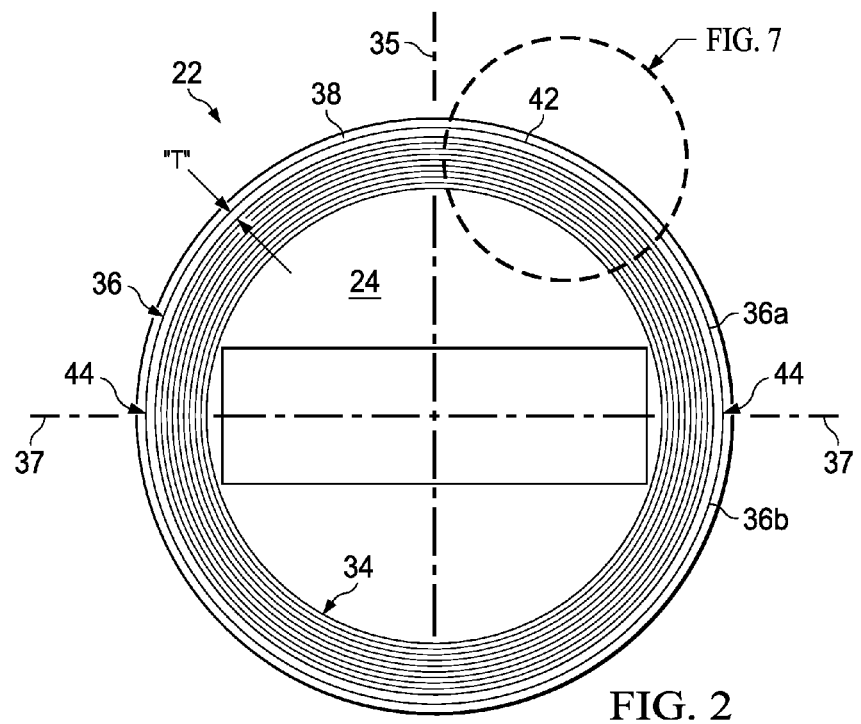
FIG. 2 is an illustration of a sectional view taken along the line 2-2 in FIG. 1.

Referring now to FIG. 2, the tubular body 22 broadly comprises a generally cylindrical, sleeve-like reinforcement 36 sandwiched between a cylindrical core 34 and an outer skin 38. The sleeve-like reinforcement 36 increases the compressive strength of the tubular body 22. The core 34 may comprise multiple plies 48 (FIG. 7) of a suitable fiber reinforced resin, such as, without limitation, carbon fiber reinforced plastic (CFRP) that may be laid up over a removable mandrel (not shown) by manual or conventional automated layup techniques. The outer skin forms a protective covering over the sleeve-like reinforcement 36 and may also comprise multiple laminated plies of a fiber reinforced resin. The plies of the outer skin 38 also hold the sleeve-like reinforcement 36 in place and may enable the reinforcement 36 to better resist compressive loading.

In one embodiment, the sleeve-like reinforcement is cylindrical in shape and may comprise a layer of material 42 formed as semi-circular first and second reinforcement halves 36a, 36b that extend substantially the entire length of the tubular body 22. In other embodiments, the layer of material 42 may comprise a single member or more than two members. The layer 42 may comprise a suitable material that exhibits the desired degree of compression strength, such as a metal foil or a ceramic, and is compatible with the material forming the core 34. For example, where the core 34 is formed of CFRP, the layer of material 42 forming the reinforcement 36 may comprise titanium. The layer 42 may also comprise a precured resin that contains unidirectional reinforcement fibers such as, without limitation, steel fibers which resist axial compression loads applied to the strut 20. The compressive strength of the sleeve-like reinforcement 36 is greater than that of the resin forming the core 34 in order to increase the overall compressive strength of the strut 20.

In the illustrated example employing a two-piece reinforcement 36, the halves 36a, 36b may be preformed and then assembled around the core 34, forming diametrically opposite joint lines or seams 44. The reinforcement halves 36a, 36b may or may not be mechanically joined along the seams 44. In one embodiment, although not shown in the Figures, the two halves 36a, 36b may overlap each other along the seams 44 in order to allow the halves 36a, 36b to slip relative to each other and collapse slightly as the underlying core 34 shrinks during consolidation and curing of the core 34. The thickness "T" of the layer of material 42 may vary with the application, depending upon the amount of compressive strength that is desired to be added to the strut 20. While only a single cylindrical reinforcement 36 is shown in the illustrated example, the strut 20 may include multiple axially concentric reinforcements 36 (not shown) embedded in the tubular body 22. In still other embodiments, the reinforcement 36 and/or the core 34 may taper from a thin cross section portion to a thicker cross section portion along the length of the tubular body 22, while the outer cylindrical shape of the tubular body 22 remains substantially constant.

Figure 3:
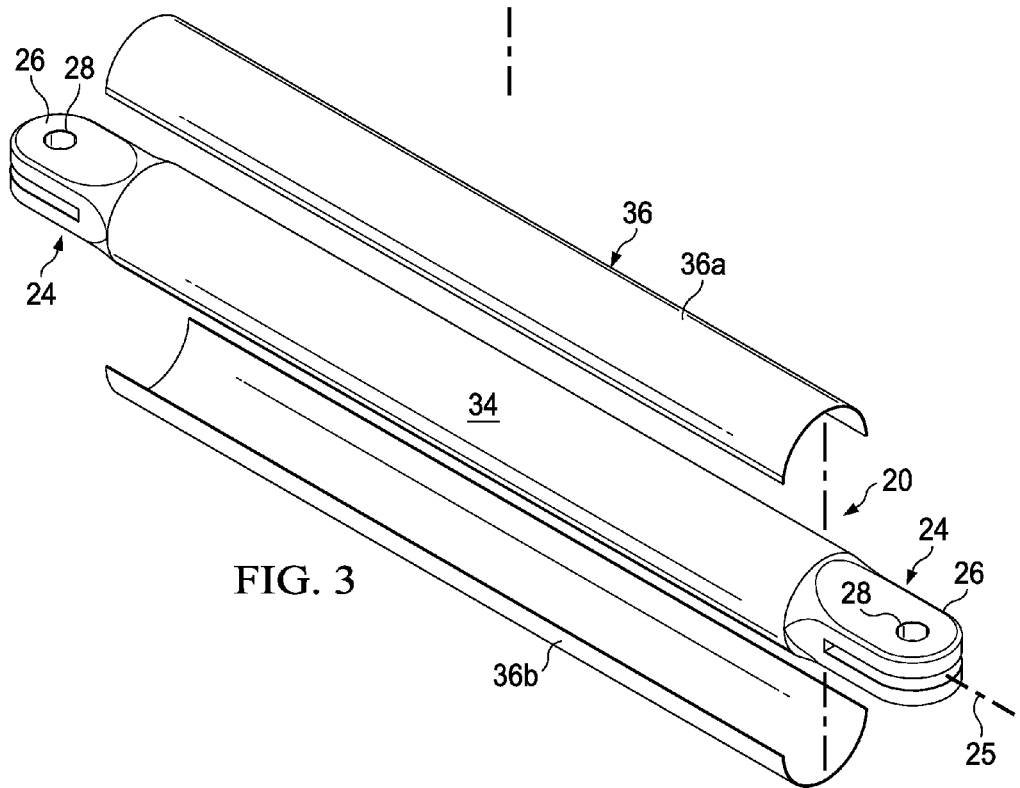
FIG. 3 is an illustration of a perspective view of the strut shown in FIG. 1 in an intermediate stage of fabrication in which two halves of a reinforcement are being installed on a laminate core.
Figure 4:
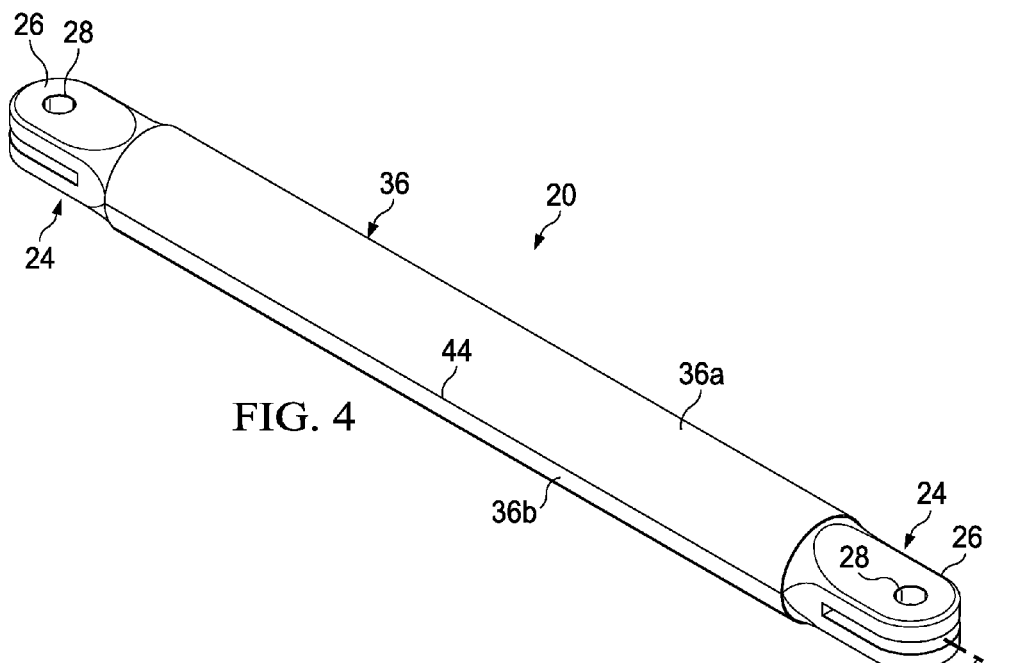
FIG. 4 is an illustration similar to FIG. 3, but showing the two halves of the reinforcement having been installed.

Referring to FIG. 3, strut 20 may be assembled by laying up plies 48 (FIG. 7) of the core 34 over end fittings 24, however other methods of attaching the end fittings 24 to the core 34 are possible. The two halves 35a, 36b of the sleeve-like reinforcement 36 may be preformed by any suitable process, and then assembled over the core 34. Depending of the thickness "T" (FIG. 2) of the reinforcement 36, the reinforcement 36 may be formed-to-shape by forming a layer of material 42 over the core 34, using the core 34 as a mandrel. FIG. 4 illustrates the two halves 36a, 36b having been assembled over the core 34 and depicts one of the seams 44, which, as previously mentioned, may represent a mechanical joint line attachment of the two halves 36a, 36b. The circumferential location of the seams 44 may be chosen so as to optimize the buckling strength of the tubular body 22. For example, in the illustrated embodiment, the seams 44 may be located circumferentially such that they lie in or near a plane 37 (FIGS. 1 and 2) that is substantially perpendicular to the plane 35 of the clevis pins 30. Orienting the seams 44 generally perpendicular to the axes of the pins 30 in this manner may better enable the reinforcement 36 to resist bending moments in a plane near or substantially parallel to or within the plane 35 and thereby improve the bucking strength of the strut 20. However, it should be noted that the benefits provided by the disclosed embodiments may be realized even when the seams 44 are not located at circumferential positions that optimize the buckling strength of the strut 20.

Figure 5:
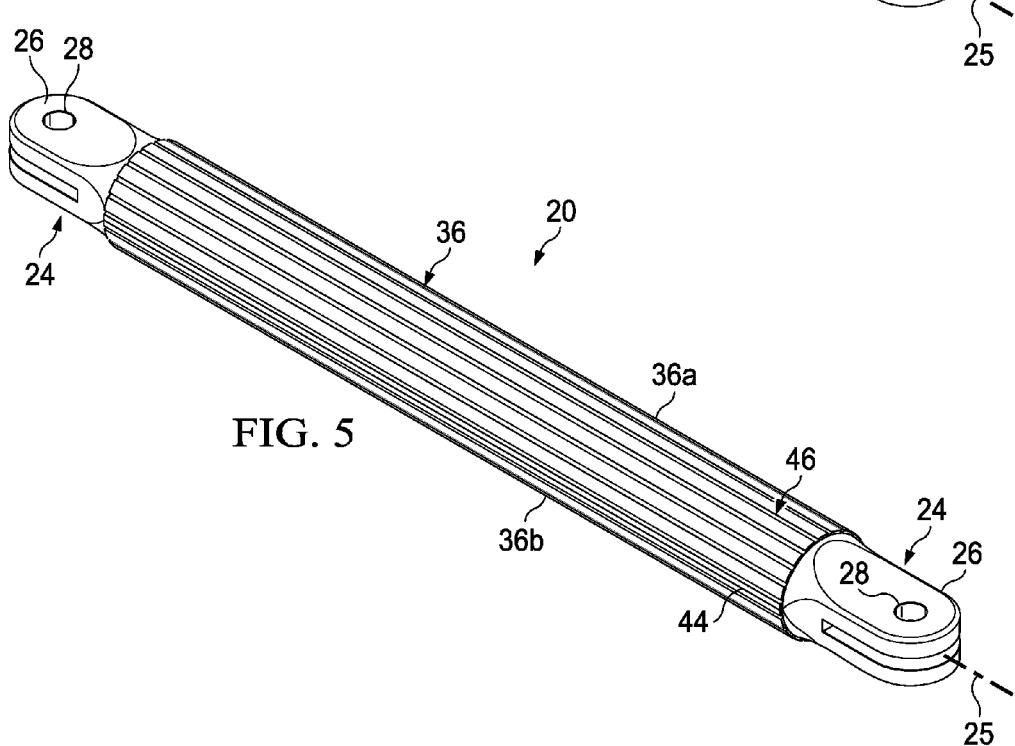
FIG. 5 is an illustration similar to FIG. 4 but showing an alternate embodiment of the reinforcement having corrugations.
Figure 6:
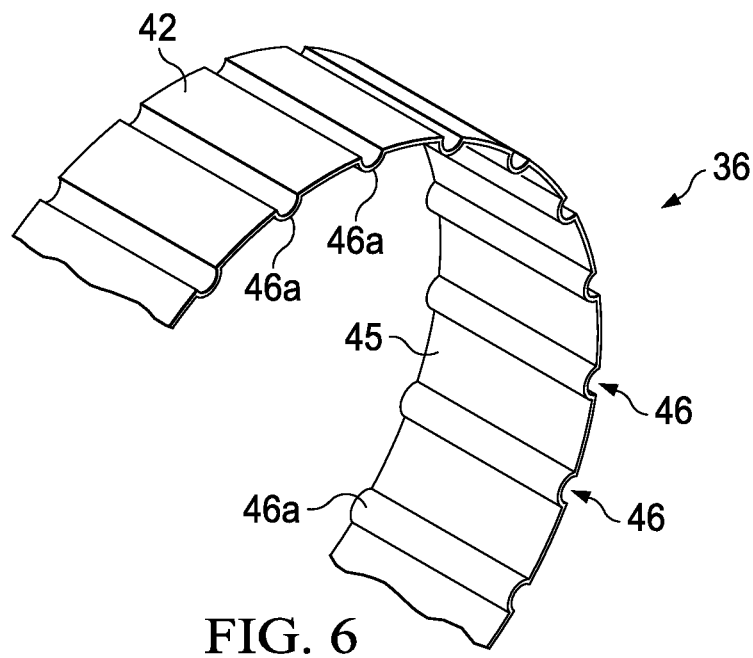
FIG. 6 is an illustration of a perspective view of the corrugated reinforcement, in the area shown as 6-6 in FIG. 5.
Figure 7:
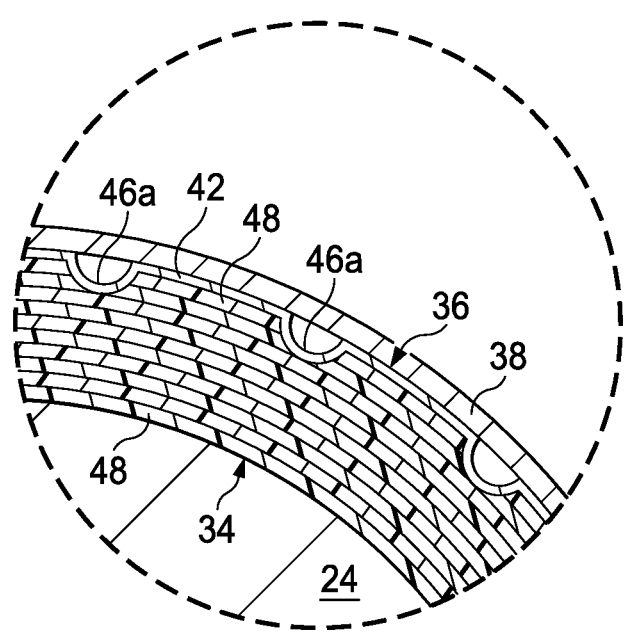
FIG. 7 is an illustration of the area designated as FIG. 7 in FIG. 2, but illustrating use of the corrugated form of the reinforcement.

FIG. 5 illustrates an alternate embodiment of the strut 20 that includes a two-piece sleeve-like cylindrical reinforcement 36 having corrugations 46. Referring to FIG. 6, the corrugations 46 include circumferentially spaced, longitudinally extending corrugation ridges 46a on the inside face 45 of the reinforcement 36. The corrugations 46 may be formed by any of a variety of processes that are suited to the material from which the reinforcement 36 is made. Referring to FIG. 7, it can be seen that the ridges 46a of the corrugation 46 extend down into and are compressed against the laminated plies 48 of the core 34. During consolidation and curing of the strut 20, the core shrinks and the corrugation ridges 46a are compacted against the core 34, tending to control wrinkle formation in the plies 48 of the core 30. This wrinkle control is achieved as a result of the corrugation ridges 46a depressing and lengthening portions of the plies 48 around the ridges 46a in order to tighten and/or absorb the shrinkage of the plies 48 during consolidation/curing.

Figure 8:
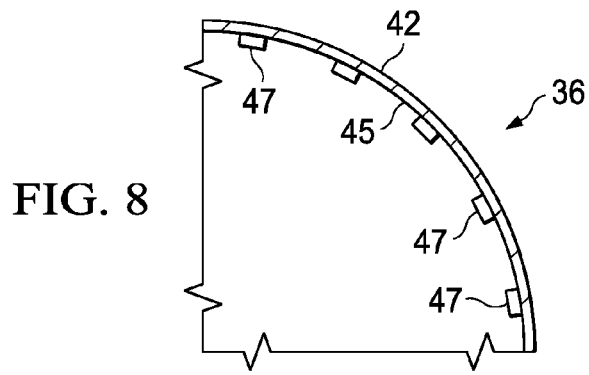
FIG. 8 is an illustration of a cross sectional view of another form of the reinforcement.

The ability of the sleeve-like reinforcement 36 to control wrinkling of the underlying plies 48 during the consolidation process may be achieved using other forms of the reinforcement 36. For example, referring to FIG. 8, in lieu of corrugating the layer of material 42 comprising the reinforcement 36 as described above, longitudinally extending, spaced apart raised strips 47 of any suitable material may be applied by a suitable technique to the inside face 45 of the layer of material 42, either before or after the layer of material 42 has been formed into the desired shape.

Figure 9:
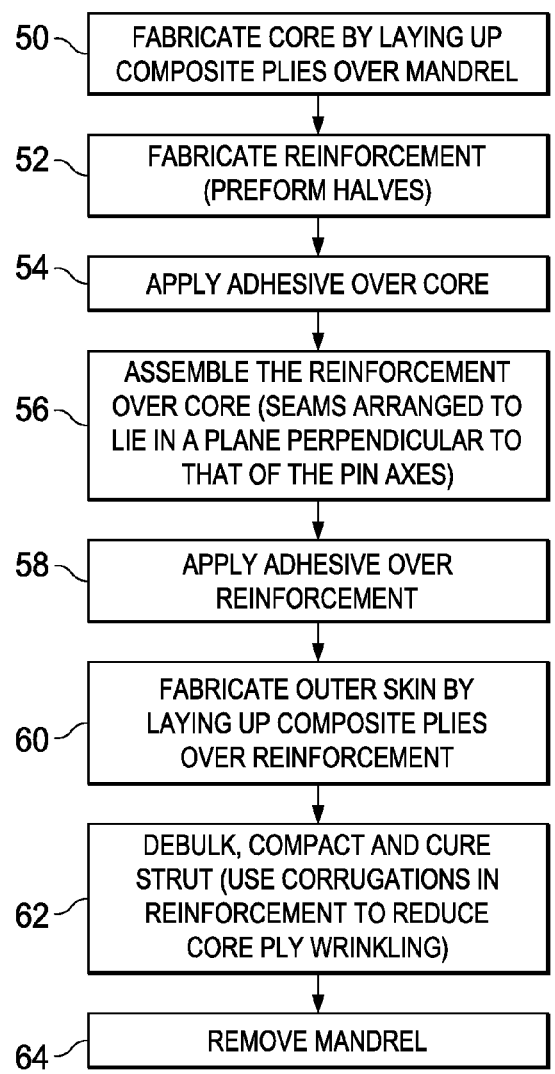
FIG. 9 is an illustration of a flow diagram of a method of fabricating a hybrid composite columnar structure according to the disclosed embodiments.

Attention is now directed to FIG. 9 which illustrates the overall steps of a method of fabricating the composite tubular strut 20 described previously. Beginning at 50, laminated core 30 is fabricated by laying up composite plies 48 over a suitable mandrel (not shown), which may be for example, an inflatable or ablative mandrel. Next, at 52, the reinforcement 36 may be fabricated either by preforming one or more layers of material 42 into halves 36a, 36b of the desire cross sectional shape, or by forming the material over the core 30, using the core 30 as a mandrel. At step 54, a suitable adhesive is applied over the core 30, following which at 56, the reinforcement 36 is assembled over the core 30. The seams 44 between the reinforcement halves 36a, 36b may be located such that they lie substantially in a plane 37 that is substantially perpendicular to the plane 35 of the clevis pin 30 axes 32 in order to better resist bending forces, however, the seams 44 may be located at other points, depending on the construction and geometry of the end fittings 24. At step 58 a suitable adhesive is applied over the reinforcement 36. At step 60, outer skin is applied over the reinforcement 36 by laying up additional composite plies over the reinforcement 36. At step 62, the strut 20 is debulked, compacted and cured, thereby co-bonding the reinforcement 36 to the core 30 and the outer skin 38. Finally, at step 64, the mandrel on which the core 30 is laid up may be removed.

Figure 10:
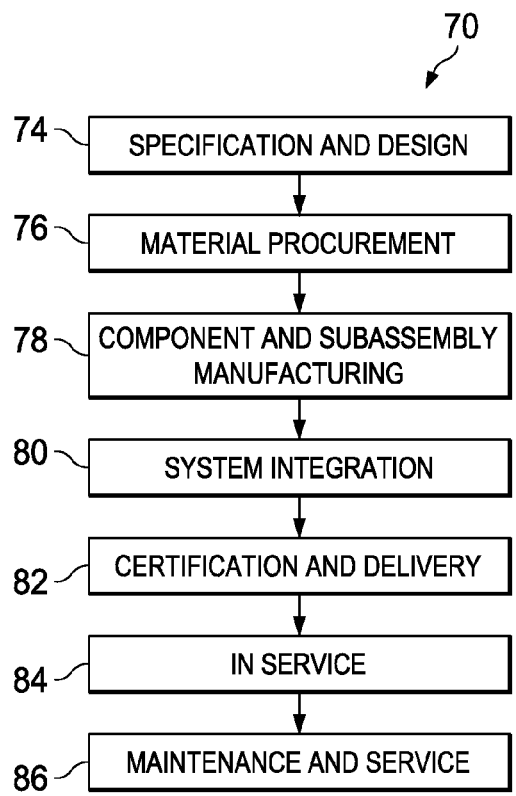
FIG. 10 is an illustration of a flow diagram of aircraft production and service methodology.
Figure 11:
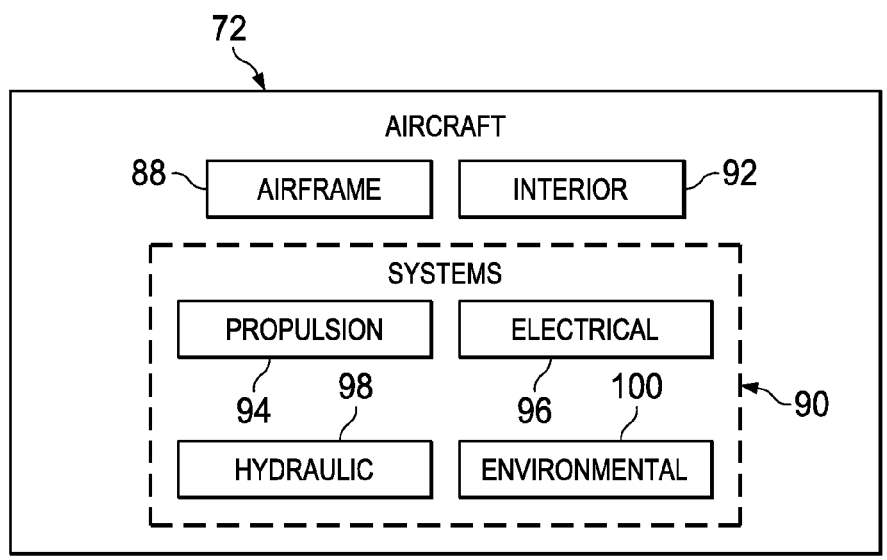
FIG. 11 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 10 and 11, embodiments of the disclosure may be used in the context of an aircraft manufacturing and service method 70 as shown in FIG. 10 and an aircraft 72 as shown in FIG. 11. Aircraft applications of the disclosed embodiments may include, for example, without limitation, load transferring members such as struts, supports, connecting rods and similar columnar structures. During pre-production, exemplary method 70 may include specification and design 74 of the aircraft 72 and material procurement 76. During production, component and subassembly manufacturing 78 and system integration 80 of the aircraft 72 takes place. Thereafter, the aircraft 72 may go through certification and delivery 82 in order to be placed in service 84. While in service by a customer, the aircraft 72 is scheduled for routine maintenance and service 86, which may also include modification, reconfiguration, refurbishment, and so on.

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 72 produced by exemplary method 70 may include an airframe 88 with a plurality of systems 90 and an interior 92. Examples of high-level systems 90 include one or more of a propulsion system 94, an electrical system 96, a hydraulic system 98, and an environmental system 100. Any number of other systems may be included. Although an aerospace example is shown, the principles of the disclosure may be applied to other industries, such as the marine and automotive industries.

Systems and methods embodied herein may be employed during any one or more of the stages of the production and service method 70. For example, components or subassemblies corresponding to production process 78 may be fabricated or manufactured in a manner similar to components or subassemblies produced while the aircraft 72 is in service. Also, one or more apparatus embodiments, method embodiments, or a combination thereof may be utilized during the production stages 78 and 80, for example, by substantially expediting assembly of or reducing the cost of an aircraft 72. Similarly, one or more of apparatus embodiments, method embodiments, or a combination thereof may be utilized while the aircraft 72 is in service, for example and without limitation, to maintenance and service 86.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A columnar structure, comprising:
a composite laminate core comprising a plurality of fiber reinforced resin layers, the composite laminate core having a longitudinal orientation;
an outer composite skin surrounding the composite laminate core;
a first end fitting positioned at a first end of the columnar structure;
a second end fitting positioned at a second end of the columnar structure; and
a band comprising:
a single cylindrical sleeve encircling the composite laminate core between the outer composite skin and the composite laminate core, the single cylindrical sleeve comprising a plurality of corrugation ridges that are inwardly facing relative to the columnar structure and that are parallel to each other along the longitudinal orientation, the single cylindrical sleeve further comprising a plurality of sections between the plurality of corrugation ridges, the plurality of sections having a first curvature matching a second curvature of the outer composite skin, wherein the plurality of corrugation ridges have a third curvature inverted relative to the first curvature and the second curvature such that the plurality of corrugation ridges are are pressed into and depress portions of the composite laminate core, and wherein the plurality of sections abut both an outer face of the composite laminate core and an inner face of the outer composite skin.

2. The columnar structure of claim 1, wherein:
the composite laminate core is substantially tubular, and
the single cylindrical sleeve comprises a first half and a second half assembled together along a pair of seams that extend in the longitudinal orientation.

3. The columnar structure of claim 2, wherein:
the single cylindrical sleeve comprises titanium, and
the composite laminate core is a carbon fiber reinforced plastic.

4. A strut comprising:
a core comprising a tubular, reinforced fiber resin and having a longitudinal orientation;
a skin comprising a composite material and surrounding the composite laminate core;
a band comprising:
a single sleeve encircling the core between the skin and the core, the single sleeve comprising a plurality of corrugation ridges that are inwardly facing relative to the core and that are parallel to each other along the longitudinal orientation, the single sleeve further comprising a plurality of sections between the plurality of corrugation ridges, the plurality of sections having a first curvature matching a second curvature of the skin, wherein the plurality of corrugation ridges have a third curvature inverted relative to the first curvature and the second curvature such that the plurality of corrugation ridges are pressed into and depress portions of the core, and wherein the plurality of sections abut both an outer face of the core and an inner face of the skin; the sleeve includes first and second halves assembled together along a pair of seams extending in a first plane in the longitudinal orientation of the fiber reinforced resin core,
a first end fitting attached to a first end of the strut, the first end fitting including a first attachment pin; and
a second end fitting attached to an opposite end of the strut from the first end fitting, the second end fitting including a second attachment pin, the first attachment pin and the second attachment pin having a radial position lying substantially in a second plane of the longitudinal orientation and adapted to attach the strut to a structure, the first plane positioned substantially perpendicular to the second plane.

5. The strut of claim 4, wherein the single sleeve is metal.

6. The strut of claim 4, wherein the single sleeve is composed of two hemispheres joined at a pair of seams, wherein the pair of seams are located at positions around the core that substantially optimize the buckling strength of the strut.

7. The strut of claim 4, wherein the single sleeve is ceramic.

8. The strut of claim 4, wherein:
the single sleeve is titanium and is cylindrical; and
the fiber reinforced resin core is carbon fiber reinforced plastic.

9. The strut of claim 4, wherein the single sleeve is a metal foil wrapped around the core and joined to itself along a single seam.

10. The strut of claim 9,
wherein the single sleeve is co-bonded to the core and to the skin.

11. The columnar structure of claim 1, wherein the composite laminate core is hollow.

12. The columnar structure of claim 1, wherein the single sleeve tapers in cross section thickness along a length of the reinforcement.

13. A strut comprising:
a hollow core comprising a plurality of layers of fiber reinforced resin, the hollow core having a longitudinal orientation;
a first end fitting disposed at a first end of the core, the first end fitting including a first attachment pin;
a second end fitting disposed at a second end of the core, the second end fitting including a second attachment pin, the first attachment pin and the second attachment pin having a radial position substantially aligned along a first plane in the longitudinal orientation of the hollow core;
an outer skin disposed around the hollow core and comprising at least one ply of fiber reinforced resin; and
a reinforcement comprising:
a single cylindrical sleeve encircling the hollow core between the outer skin and the hollow core, the single cylindrical sleeve comprising a plurality of corrugation ridges that are inwardly facing relative to the hollow core and that are parallel to each other along the longitudinal orientation, the single cylindrical sleeve further comprising a plurality of sections between the plurality of corrugation ridges, the plurality of sections having a first curvature matching a second curvature of the outer skin, wherein the plurality of corrugation ridges have a third curvature inverted relative to the first curvature and the second curvature such that the plurality of corrugation ridges are are pressed into and depress portions of the hollow core, and wherein the plurality of sections abut both an outer face of the hollow core and an inner face of the outer skin.

14. The strut of claim 13, wherein the reinforcement comprises metal.

15. The columnar structure of claim 1 wherein the plurality of corrugation ridges have an arcuate shape, and wherein the third curvature is greater than the first curvature and the second curvature.

16. The strut of claim 4 wherein the plurality of corrugation ridges have an arcuate shape, and wherein the third curvature is greater than the first curvature and the second curvature.

17. The strut of claim 13 wherein the plurality of corrugation ridges have an arcuate shape, and wherein the third curvature is greater than the first curvature and the second curvature.

18. The columnar structure of claim 1, wherein the single sleeve is a metal foil wrapped around the core and joined to itself along a single seam.

19. The columnar structure of claim 1, wherein the outer composite skin comprises a plurality of layers of composite material.

\* \* \* \* \*

UNITED STATES PATENT AND TRADEMARK OFFICE
CERTIFICATE OF CORRECTION

PATENT NO. : 9,486,965 B2  
APPLICATION NO. : 13/326005  
DATED : November 8, 2016  
INVENTOR(S) : Stewart Page 1 of 1

It is certified that error appears in the above-identified patent and that said Letters Patent is hereby corrected as shown below:

In the Claims

Column 7, Line 28, change "are are pressed" to -- are pressed --  
Column 8, Line 62, change "are are pressed" to -- are pressed --

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*